United States Patent [19]

Birchall et al.

[11] 4,040,021

[45] Aug. 2, 1977

[54] CIRCUIT FOR INCREASING THE APPARENT OCCUPANCY OF A PROCESSOR

[75] Inventors: Ronald Holmes Birchall, Wheaton; Frank Vincent Pellettiere, Schaumberg; William John Skeens, Woodridge, all of Ill.

[73] Assignee: Bell Telephone Laboratories, Incorporated, Murray Hill, N.J.

[21] Appl. No.: 627,186

[22] Filed: Oct. 30, 1975

[51] Int. Cl.² .............................................. G06F 1/04
[52] U.S. Cl. .................................................... 364/200
[58] Field of Search ...................... 340/172.5, 146.1 C; 444/1; 235/153 R, 153 AK, 92 T

[56] References Cited

U.S. PATENT DOCUMENTS

| | | | |
|---|---|---|---|
| 3,372,381 | 3/1968 | Raspanti | 340/172.5 |
| 3,582,896 | 6/1971 | Silber | 340/172.5 |
| 3,623,007 | 11/1971 | Eckhart et al. | 340/172.5 |
| 3,623,017 | 11/1971 | Lowell et al. | 340/172.5 |
| 3,698,007 | 10/1972 | Malcolm et al. | 340/172.5 |
| 3,701,973 | 10/1972 | von der Pfordten | 340/172.5 |
| 3,715,728 | 2/1973 | Fontaine et al. | 340/172.5 |
| 3,751,645 | 8/1973 | Brandsma et al. | 444/1 X |
| 3,845,475 | 10/1974 | Massaloux | 340/172.5 |
| 3,932,843 | 1/1976 | Trelut et al. | 340/172.5 |
| 3,932,847 | 1/1976 | Smith | 340/172.5 |
| 3,946,363 | 3/1976 | Hakozaki | 340/172.5 |

OTHER PUBLICATIONS

"Organization of the No. 1 ESS Stored Program" in Bell System Technical Journal, Sept. 1964, pp. 1927-1928, 1943-1959 and 2005-2009.

Smith, R. M. "Data Processing System Timing Facility" in IBM Technical Disclosure Bulletin; vol. 14, No. 10, Mar. 1972; pp. 3071-3073.

Fangmeier, L. J. et al.; "Processor Control By Two Independent Phase-Locked Clocks" in IBM Tech. Discl. Bull.; vol. 14, No. 11, Apr. 1972; pp. 3394-3395.

*Primary Examiner*—Melvin B. Chapnick
*Attorney, Agent, or Firm*—Howard R. Popper

[57] ABSTRACT

An arrangement for measuring the load handling capacity of a stored program control process control system. The process control system is first operated in a monitor mode without any load in order to identify the instructions which must be executed independently of load and therefore, may be characterized as "overhead work" instructions. While operating in the no load or monitor mode, each instruction which is executed is flagged by placing "1" in a flag position of the instruction word. The machine includes provisions for executing instructions so flagged with standard machine timing and for executing unflagged instructions with extended machine timing. The unflagged instructions are termed "load related work" instructions and by extending the time required to execute such instructions, the apparent load to the machine is increased, increasing the machine's apparent occupancy. The time for executing a "load related work" instruction is extended by integral numbers of clock frames. Only the instruction execution clock signal timing is altered during the execution of "load related work" instructions and all other measurements of time which denote the absolute passage of time or "real-time" are maintained. Having characterized and identified the "overhead work" instructions, a load is presented and the machine operates as above described. Accordingly, the effect of a relatively small load on a processor may be magnified to varying degrees by establishing a variety of different delays in the execution of "load related work" instructions.

12 Claims, 3 Drawing Figures

CIRCUIT FOR INCREASING THE APPARENT OCCUPANCY OF A PROCESSOR

BACKGROUND OF THE INVENTION

This invention relates to stored program process control systems which perform in real time.

One example of a stored program process controlled machine which operates in real time is the No. 1 Electronic Switching System that is described in the September 1964 issue of the *Bell System Technical Journal*. Certain aspects of the No. 1 ESS including "Detailed Telephone and Maintenance Functions" are described in U.S. Pat. No. 3,570,008 which issued on Mar. 9. 1971. As described in the above-noted patent, the processor performs its operations at a number of levels of program interrupt and at a base level which comprises a plurality of sublevels A through E which are executed in an ordered sequence. This organization of interrupt levels and the base level, including the sublevel operations, is calculated to assure that the operations which must be performed in real time or near real time are handled reliably and that all system work including maintenance is routinely performed. It is desired to fully utilize a process control system, however, such systems have physical limitations which define the load which a system can handle in real time or near real time. In a telephone switching system the calls presented to the system comprise the "load" and an automatic measurement of the "occupancy" of the processor of an illustrative switching system is disclosed in B. J. Eckhart and E. S. Hoover Pat. No. 3,623,007 which issued Nov. 23, 1971. In that patent, a measure of processor occupancy is the so-called E-to-E base level return time. The sublevels or classes of work which are performed at the base level in that processor are arbitrarily termed A through E, and E is the sublevel which is performed least frequently (once per defined period of time) but which must be performed regularly.

Work operations of a stored program process controlled machine can be divided into two broad categories, namely, "overhead work" which is cyclically performed and which must be performed whether or not any "load" is presented to the machine and "load related work." Load related work may occur at a number of interrupt levels and at base level. Typically, near real time input functions, e.g., scanning of subscribers lines to detect request for service are performed in an interrupt level and detected requests are identified and stored in "hoppers" for subsequent processing at base level. The act of identifying requesting lines and storing that information in the hopper is an example of "load related work" which is performed at an interrupt level. The subsequent processing of the requests which have been placed in the "hoppers" and served at base level is an example of "load related work" performed at base level.

In adapting a large program controlled machine to perform new tasks or to perform old tasks in a more efficient manner, a considerable amount of programming, or reprogramming effort, is typically required. A new program may entail hundreds of man hours of effort and involve the labors of many people. Such a program should not be released to the field until it is sufficiently tested to assure its reliability. Thorough testing would involve running the program at different levels of offered traffic including high levels of processor occupancy. As can be appreciated from a consideration of the above-mentioned Eckhart-Hoover system, the central processor will traverse certain program loops only under very heavy traffic conditions. Heretofore, it has been very difficult effectively to load down large and powerful processors because to do so requires the artificial generation of heavy traffic.

Whether the traffic is simulated through signals applied to the peripheral buses or is simulated by load devices attached to the telephone network and programmed to generate various types of traffic in a random fashion, massive amounts of circuitry are required to provide a range of loads.

SUMMARY OF THE INVENTION

In accordance with the present invention the instructions which make up the program of a program controlled process controller are individually identified as being associated with "overhead work" or "load related work", and the processor is arranged to execute the "overhead" instructions under timing conditions which are standard for the processor under test while executing the "load related work" instructions under timing conditions which serve to extend the time required to execute such "load related work" instructions. Where a particular instruction or set of instructions are shared by "overhead" and "load related work" the instructions must be characterized as one or the other for the purpose of an acceptable approximation of system performance. As a practical matter from a standpoint of measuring system performances, such shared instructions can reasonably be assigned to either category without drastically biasing the results of the measurements. The individual instructions can be readily identified by operating the system without presenting a load and flagging each instruction that is executed under those conditions. Therefore, in a practical sense any shared instructions are at this point characterized as being associated with "overhead work." Advantageously the flags which identify "overhead work" instructions may be placed in an available bit of the instructions word or alternatively may be placed in individual bit positions of an auxiliary memory wherein there is one bit position assigned to each word location in the program memory.

In accordance with an aspect of this invention, a "standard load" is offered to the processor either via the peripheral bus circuitry or via connections to the network assuming the network is connected to the processor and the instructions which are flagged as being associated with "overhead work" are executed without alteration of the normal timing of the processor, however, those instructions which are not flagged and are thus characterized as being associated with "load related work" are executed under timing conditions which extend the time required to execute such instructions. Specifically, the timing pulses utilized in the processor in the execution of such instructions are not altered in duration, however, generation of timing pulses utilized in the execution of instructions is temporarily suspended for periods of time which have durations which are integral multiples of a normal timing frame. That is, it is assumed that instructions are executed within a timing plan which includes a "frame" of standard duration, e.g., 5.5 microseconds and in the execution of unflagged "load related work" instructions, the time of execution of such instructions is extended to 2, 3, 4, or $n$ frames. The amount of delay determines the apparent traffic processed by the system for a given set of input traffic conditions and the longer the delay the greater the apparent load. The generation of such timing signals must be suspended at an appropriate time in the frame otherwise basic timing relationships between the control unit, the memories, and the peripheral units can be destroyed. In the illustrative embodiment a 5.5 microsecond frame is divided into 22 intervals and the generation of such instruction execution signals is suspended at a point in the frame termed *t*5. This time is chosen since at this point in the timing frame a new instruction has been moved into the appropriate instruction register and processing of this instruction can proceed immediately after time *t*5 or any integral number of frames thereafter without disrupting the timing relationships between the processor, the memories, and the peripheral units.

Only the clock signals associated with the execution of instructions are suspended and all other timing utilized within the processor is maintained. Accordingly, there is maintained in the processor a record of passage of reference of "real-time" which permits an evaluation of processor performance as measured, for example, by the E-to-E return time referenced above herein.

BRIEF DESCRIPTION OF THE DRAWING

The foregoing and other objects and features of our invention may become more apparent from the ensuing detailed description when read together with the drawing in which.

GENERAL DESCRIPTION

Figure 1:
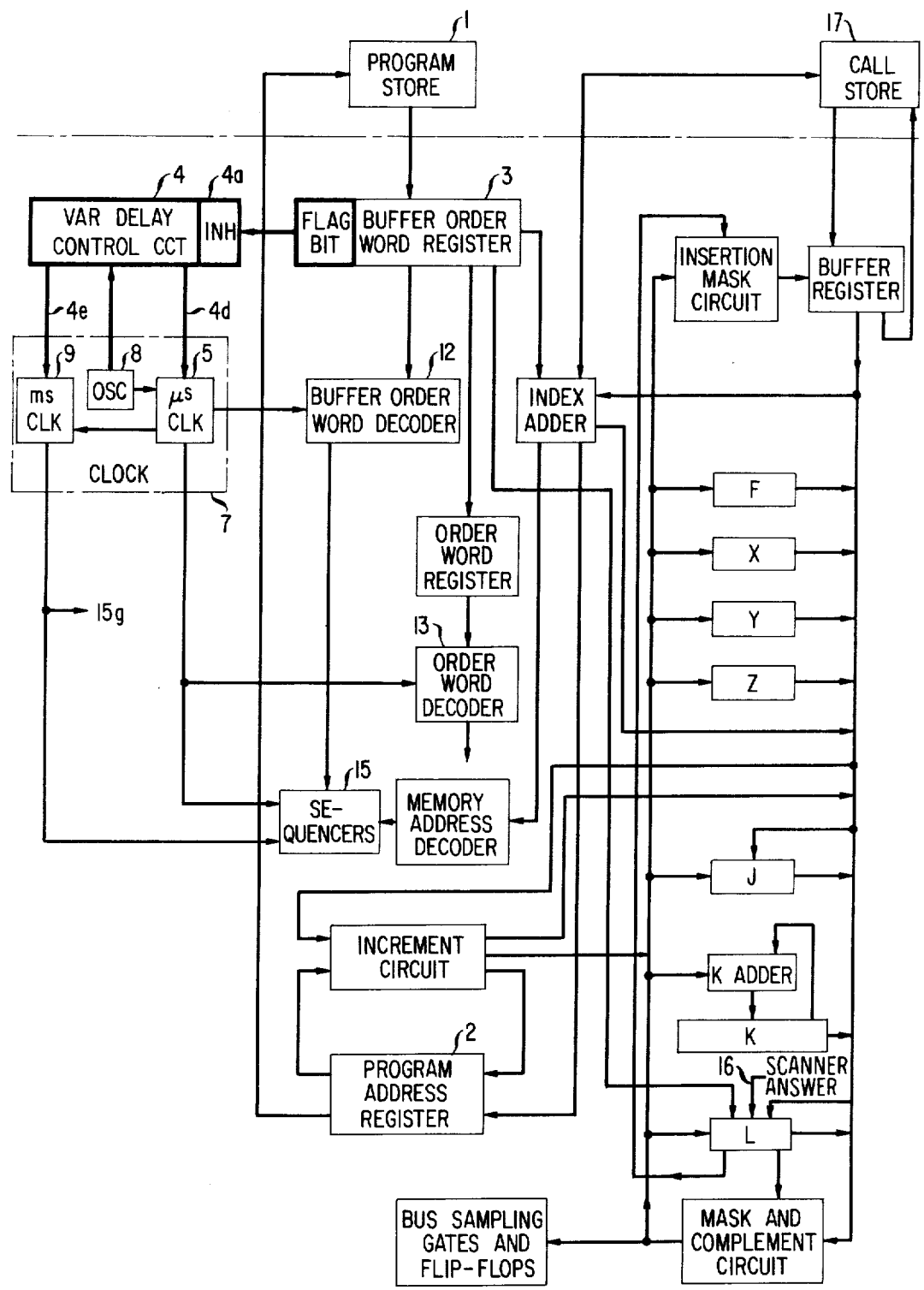
FIG. 1 is an overall block diagram showing our invention in the content of an illustrative prior art central processor system.

Referring now to FIG. 1 there is shown in schematic block diagram form the relationship of the variable clock control circuit 4 and 7 of our invention to the elements of a prior art central processing system. The prior art system is of the type described in detail in the aforementioned September 1964 issue of the Bell System Technical Journal. The elements of our invention are shown in heavy outline compared to the lighter line weight used to depict the elements of the prior art system. Inasmuch as the prior art elements are labeled in self-explanatory manner and moreover are thoroughly discussed in the aforementioned references and are otherwise well known, their function and operation will not be further belabored therein.

As previously explained herein a process control system such as the illustrative telephone switching system of FIG. 1 is first operated in the absence of load and each instruction obtained from the program store 1 and executed under the no load condition is flagged by circuitry either within the program store 1 or external to the program store and not shown herein. This circuitry, when activated, serves to place a "1" in the flag bit position of each instruction which is read from the program store 1. Having identified and characterized the "overhead work" instructions, a load is presented to the processor and the processor reaction under a variety of apparent load conditions is determined. In the illustrative example of FIG. 1, the principal external source of "load" for the machine is the scanner answer bus 16 which is connected to the L register. In the illustrative telephone switching system, requests for service, e.g., requests for connection and disconnection and all signaling information reaiative to calls serviced by the system are presented to the machine via the scanner answer bus of FIG. 1. However, when a request for service has been detected, whether that request be for an origination or termination of a call, information is placed in the "work hoppers" of the machine which comprise blocks of storage in the call store 17. Accordingly, the program instructions which subsequently serve the work in the hoppers represent load related work. The inhibit portion 4*a* of the variable delay control circuit 4 in the absence of a flag in the instruction being executed will cause the control circuit 4 to slow down the execution of the call processing instruction causing the pro tanto increase in the E-to-E return time. Control circuit 4 counts impulses from master oscillator 8, which is part of the master clock circuit 7, and will control clock 5 over lead 4*d* so that clock 5 can deliver only every alternate, third, fourth, fifth, etc., oscillator pulse to the prior art central processor circuits 12, 13, 15, etc.

It is an aspect of the operation of the system of my invention, that only a very small amount of traffic need be presented to the system in order to generate any desired degree of increased processor occupancy.

When a flagged, maintenance or other overhead instruction is received in buffer order word register 3, the flag bit byte will be detected by inhibit circuit 4*a* and the variable delay control circuit 4 of my invention will be inhibited so that the fixed and predetermined number of overhead instructions will be executed in the normal manner, i.e., in "real" time.

When variable delay control circuit 4 is inhibited, oscillator 8 drive microsecond clock 5 and this clock in turn directly drives the millisecond, real-time defining clock 9. However, when variable delay control circuit 4 is operative to delay for a predetermined number of beats the delivery of the microsecond clock 5 signals, an alternative output is provided over lead 4*e* so that the pulses from oscillator 8 may drive millisecond clock 9 in an uninterrupted and completely normal manner. Thus, real time clock 9 operates to declare "real time" under all conditions.

In the prior art processor, microsecond clock 5 controlled the execution of instructions that were registered in register 3 by delivering a plurality of appropriate gate control signals to buffer order word decoder 12, order word decoder 13, and sequencer 15. In addition, millisecond clock 9 delivered real-time defining clock pulses to the sequencer circuit 15, to the "time table" programs described in S. Silber U.S. Pat. No. 3,582,896 issued June 1, 1971, to the J-level interrupt circuit described in the above-mentioned Eckhart-Hoover patent and, over lead 15*g*, to the other gates of the system (not shown in detail) so that these gates might respond to program orders to perform appropriate real-time tasks. In accordance with my invention, however, the real-time defining clock 9 is still permitted to deliver such real-time defining signals which the output of microsecond clock 5 is selectively inhibited so that call processing instructions may be executed at a predetermined slow rate.

For example, if as in the illustrative prior art system, there are five classes of base level work and it is assumed that classes A through D encompass "useful" or real-time call processing operations whereas class E may be assumed to encompass only the fixed amount of maintenance and overhead work, then the processor will be forced to spend a predeterminably increased length of time in one or more of classes A through D before it progresses on to the execution of the overhead tasks encompassed within the class E. Accordingly, when the system returns to the processing of class E base level work, the E-to-E level return time, measured, as described in the aforementioned Eckhart-Hoover patent during the J-level real-time interrupt, will have increased by a certain amount. If processor occupancy be defined as that percentage of time spent doing call processing work, and the time spent doing overhead work is fixed whereas the call processing work is done in "slow motion," then an increased occupancy of any desired degree may be calculated from the relationship:

$$\text{Occupancy (increased)} = 1 - \frac{\text{Time spent doing overhead work (fixed)}}{\text{E-to-E level return time (increased)}}$$

Since the time spent doing overhead work is fixed, the increase in processor occupancy is due entirely to the artificially increased E-to-E time.

DETAILED DESCRIPTION

Figure 2:
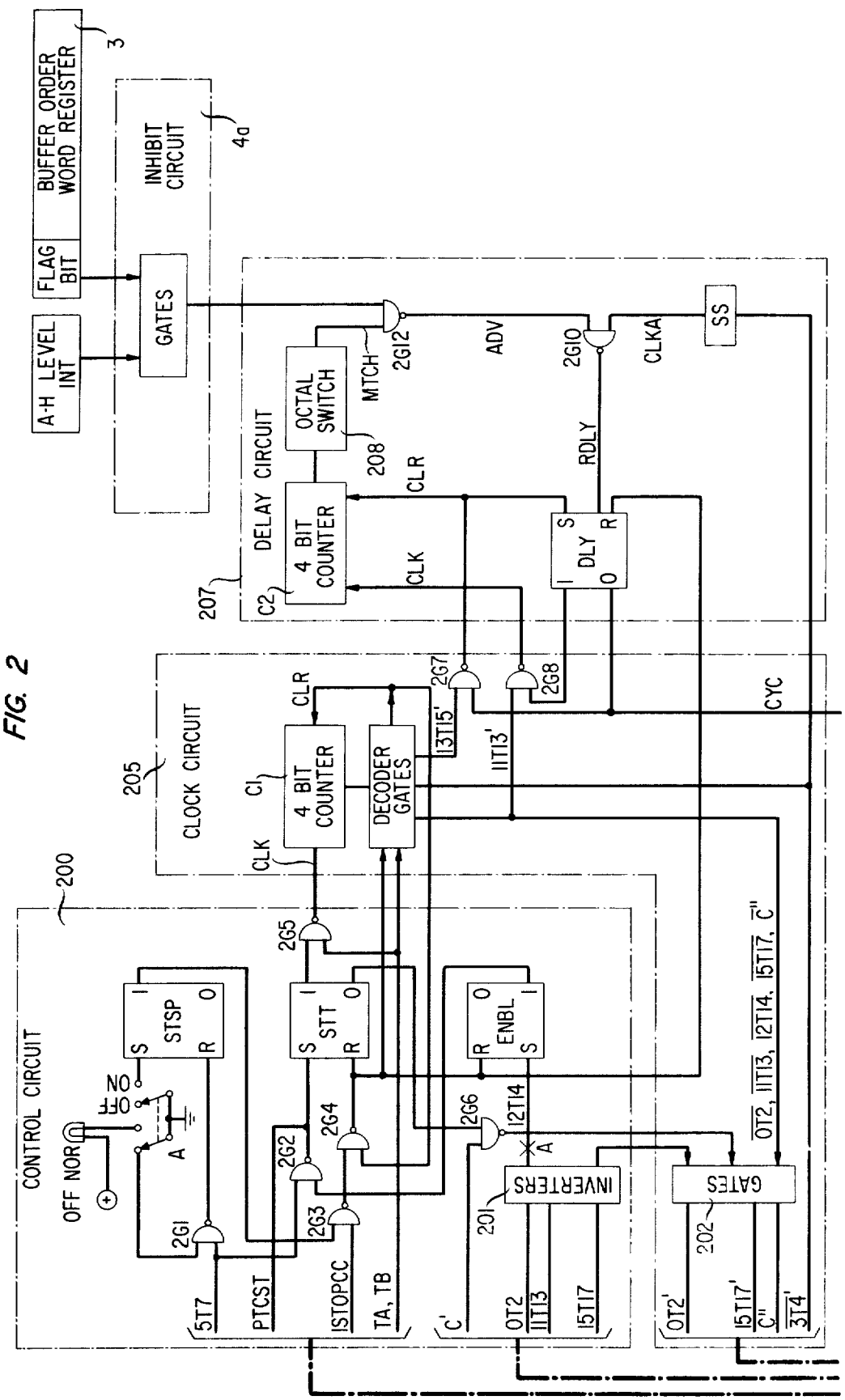
FIGS. 2 and 3 taken together show the details of the circuitry of our invention for selectively delaying the microsecond instruction-execution clock with respect to the millisecond real-time defining clock.
Figure 3:
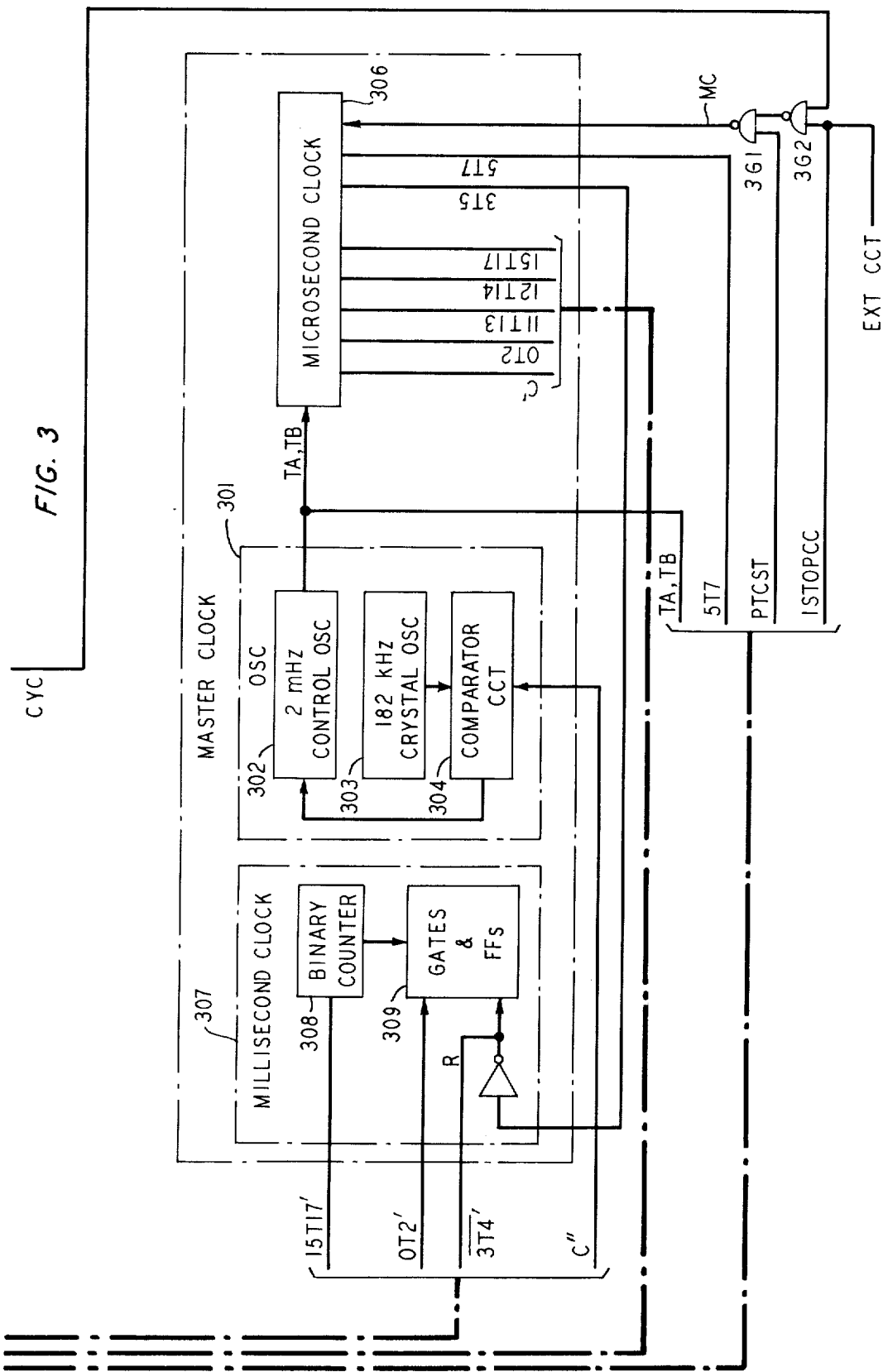

Referring now to FIGS. 2 and 3, with FIG. 2 placed above FIG. 3, there are shown the details of our circuit for selectively inhibiting the microsecond instruction-execution controlling clock by predetermined amounts while allowing the millisecond, real-time defining clock to continue to operate in a normal manner.

The heart of the master clock 300 (shown in FIG. 3) is the oscillator circuit 301 which includes a 2 megahertz control oscillator 302, a 182 kilohertz crystal oscillator 303 and a comparator circuit 304. Circuit 304 compares the output of crystal oscillator 393 with the occurrences of the nominal 5.5 microsecond repetition rate signals appearing on lead C" and accurately regulates control oscillator 302. Oscillator 302 supplies two 0.25 microsecond drive pulses TA and TB having a repetition rate of approximately 0.5 microseconds to drive microsecond clock 306. Microsecond clock 306, in turn, provides a plurality of outputs on leads C', OT2, 11T13, etc. The designations on the microsecond clock output leads identify the time and duration of their activity. For example, clock 306 produces a pulse on lead OT2 at time T0 lasting until time T2. Similarly, lead 11T13 receives a pulses from clock 306 at time T11 which lasts until time T13. Lead C' provides an output pulse every 5.5 microseconds and is the control signal used by comparator circuit 304, as will be hereinafter more fully explained.

Microsecond clock 306 may be stopped and started by controlling the logic level of lead MC with the output of gate 3G1. When lead MC is held low, microsecond clock 306 will continue to cycle until time T5, at which time it will stop. When lead MC is allowed to go high, as will hereinafter be described, clock 306 will re-start at time T5.

Although microsecond clock 306 in the forementioned electronic switching system generates 22 different clock output signals, only certain of these signals are shown in FIG. 3 as only these are of present interest. Output signals on leads 15T17 drive millisecond clock 307 (via inverters, etc. in FIG. 2). Signals on lead 15T17 will normally increment clock 307 every 5.5 microseconds while the signals on leads OT2 and 3T5 will normally provide for the output gating of signals of the millisecond clock 307 to the remainder of the processor (not shown). Microsecond clock 306 signals on leads C', OT2, 11T13, and 15T17 are gated through inverters 201 and gates 202 of FIG. 2 of our invention to leads C", OT2', 11T13', and 15T17' and thence to the circuits (not shown) of the prior art central controller so that the prior art controller will not be thrown out of synchronism when the circuitry of our invention is activated. In other words, these last-mentioned signal leads are active even when the selective delay control system of our invention is not itself activated.

When switch A is operated at the upper left-hand part of FIG. 2, the off-normal lamp is lit. The remote make contact A connects the set input of flip-flop ENBL to receive the clock 306 signals on lead 12T14 which have passed through inverters 201. The signal on lead 5T7 sets flip-flop STT via gate 2G2. The 2 megahertz oscillator 302 signals on lead TA, TB are delivered through gate 2G5 (which is enabled by the set output of flip-flop STT) to drive 4-bit counter C1 of clock circuit 205. Counter C1 has a repetition rate of 5.5 microseconds because only 11 of the possible 16 states of its 4-bit count are utilized. When state 11 is achieved (at time T3) lead CLR is activated to clear counter C1 at time T4. The count accruing in counter C1 of clock circuit 205 is monitored by the decoder gate circuit which activates its outputs 13T15' and 11T13' at the counts corresponding to the times associated with the lead designations.

Circuit 205 generates the 0.5 microsecond signals normally directly provided by microsecond clock 306 to millisecond clock 307. This direct connection is, however, in accordance with my invention, replaced by the intervention therebetween of circuit 205. In addition circuit 205 furnishes the clock frequency check signal C". Circuit 205 also provides on lead 11T13' a synchronizing signal through gate 2G8 to drive the 4-bit counter C2 of delay circuit 207.

Prior to the time that switch A was thrown, flip flop DLY will be in the reset state and its "1" output will prevent gate 2G8 from delivering the signal on lead 11T13' to increment 4-bit counter C2. When switch A is thrown however, lead 13T15' will be activated by the decoder gates at the output of counter C1 and gate 2G7 will be enabled to set flip flop DLY. Simultaneously, counter C2 will be cleared. At time T3, a signal will appear on lead $\overline{3T4'}$ to trigger one-shot circuit SS. (The signal on this lead also provides a substitute output gating control to gates 309 of clock 307, FIG. 3.) The output of circuit SS resets flip flop DLY via gate 2G10, provided that the signal on ADV is high. The signal on lead ADV will be high when the state of counter C2 matches the setting of octal switch 208.

Lead ADV may also be caused to be in the high signal condition by inhibit circuit 4a detecting the presence of a flag bit in buffer order word register 3. Even through a flag bit is not present in the flag bit byte of buffer order word register 3 if an interrupt occurs inhibit circuit 4a will detect that condition and force lead ADV high. When lead ADV is high the microsecond instruction execution clock 306 operates normally.

The setting of octal switch 208 at the output of counter C2 determines the number of times that counter C2 may be incremented by gate 2G8 before being cleared by the output of flip flop DLY. If the state of counter C2 does not match the setting of octal switch 208, the "0" output of flip flop DLY appearing on lead CYC will be coupled through gates 3G2 and 3G1 (FIG. 3) to hold lead MC in the low signal condition causing microsecond clock 306 to stop at time T5. Counter C2 in FIG. 2 will continue to be incremented every 5.5 microseconds while microsecond clock 306 is stopped. When the output of counter C2 matches the setting of octal switch 208, lead MTCH is activated enabling gate 2G12 thereby placing lead ADV, at the upper end of gate 2G10, in the high signal state. The lower input of gate 2G10 is activated by lead CLKA at the output of the 0.25 microsecond one-shot circuit SS. The activation of gate 2G10 resets flip flop DLY. With flip flop DLY reset, microsecond clock 306 is permitted to run for one cycle. With flip flop DLY reset, gate 2G7 will reset counter C2 at time 13T15' in the cycle that the microsecond clock 306 is running. If octal switch 208 does not detect a match at the end of the cycle, microsecond clock 306 will again be stopped. Accordingly, the setting of octal switch 208 determines the number of cycles that microsecond clock 306 is to be stopped.

CONCLUSION

Accordingly, I have shown a circuit arrangement for providing for the selective slow down of the microsecond, real-time instruction execution controlling clock whenever an unflagged, call processing instruction is registered in the central processor. When one of the fixed number of flagged, overhead processing instructions is registered, the instruction execution clock is not slowed down and likewise under conditions of real-time interrupt, the instruction execution clock will not be slowed. Even when the instruction execution clock is slowed, however, I provide a path for allowing the real-time measuring clock to operate normally. In this manner processor occupancy can be increased to any desired level by controlling the degree to which the instruction execution clock is artifically slowed. I have shown an illustrative embodiment in which the buffer order word register of the prior art electronic switching system has been increased by an additional bit, the flag bit byte. It should be apparent to those acquainted with the art of central processor design however that the principles of my invention may be applied to any central processing system which has two distinct real-time and instruction execution-controlling clocks and in which instructions of different types may be distinguished from each other, for example, according to operation code, address group, etc. Further and other differences will be appaent to those of skill in the art without departing from the skill and scope of the invention.

What is claimed is:

1. In a stored-program controlled processor having first clock means for controlling the execution of instructions from a program stored in the memory unit of said processor and a second clock for furnishing indications of real-time, an arrangement for increasing the apparent occupancy of said processor comprising
   means for receiving both overhead and work-load sensitive instructions from said memory unit,
   means responsive to the appearance of a work-load sensitive instruction in said receiving means for selectively inhibiting said instruction execution controlling clock means for predetermined intervals of time, and
   means operative during said selective inhibiting for allowing said real-time clock to function normally, whereby the time taken by the processor to complete the processing of all of said overhead and work-load sensitive instruction is increased by an amount disproportionately determined by the number of said work load sensitive instructions actually registered in said receiving means.

2. In a stored-program controlled processor according to claim 1, the combination wherein said first clock means is driven by a control oscillator and wherein said means for allowing said real-time clock to function normally includes means for coupling said control oscillator to said real-time clock while said first clock means is inhibited.

3. In a stored-program controlled processor having first clock means providing signals for controlling the execution of instructions from a program containing both work-load sensitive and work-load insensitive instructions stored in the memory unit of said processor and a second clock for furnishing indications of real-time, an arrangement for increasing the apparent occupancy of said processor comprising
   means for counting said signals provided by said first clock means,
   means operative incident to the execution of one of said work-load sensitive instructions, and controlled by said counting means for selectively inhibiting predetermined ones of said signals, and
   means for permitting said second clock to run normally while said first clock means signals are inhibited.

4. In a stored-program controlled processor having first clock means for controlling the execution of instructions from a program containing both work-load sensitive and work-load insensitive instructions stored in the memory unit of said processor and a second clock for furnishing indications of real-time during which both said work-load sensitive and work-load insensitive instructions are normally to be executed, an arrangement for increasing the apparent occupancy of said processor comprising
   means for temporarily registering instructions read from said memory unit,
   means connected to said temporarily registering means for ascertaining the registration therein of one of said work-load sensitive instructions, and
   means controlled by said ascertaining means for selectively inhibiting said first clock means while permitting said second clock to run normally.

5. The arrangement of claim 4 wherein said means for selectively inhibiting comprises
   means for counting signals provided by said first clock means, and
   means controlled by said counting means for selectively inhibiting predetermined ones of said signals provided by said first clock means.

6. In a stored-program controlled processor according to claim 5, the arrangement further comprising
   master oscillator means for synchronizing said first clock means to said oscillator means,
   means for normally coupling signals from said first clock means to said second clock, and
   means operative when said first clock means is inhibited for selectively coupling said master oscillator means to said second clock.

7. In a stored-program processing system having a processor, a memory unit for storing readable real-time work processing and overhead instructions, and instruction execution clock for defining processor cycles during which discrete instruction execution operations may be performed, and a real-time defining clock for designating intervals of real-time whereby the operations defined by executed instructions may be correlated with the time of their occurrences, the improvement for increasing the apparent occupancy of said processor comprising means operative incident to the reading of said instructions from said memory unit for detecting one of said real-time work processing instructions, and means controlled by said means for detecting incident to the detection of one of said real-time work processing instructions for selectively delaying predetermined clock pulses of said instruction execution clock while permitting said real-time defining clock to operate normally.

8. In a stored-program controlled processing system having a central processor, a memory unit containing a program of stored overhead and call processing instructions to be executed by said processor, a first clock for controlling the sequential execution of said instructions, an arrangement for increasing the apparent occupancy of said processor to cause said processor to execute predetermined ones of said stored call processing instructions appropriate to heavy load conditions, comprising means for temporarily registering each instruction read from said memory unit, means connected to said temporarily registering means for distinguishing the registration therein of an overhead instruction from a call processing instruction, and means controlled by said distinguishing means for increasing the time taken by said processor to execute each or said call processing instructions while controlling said overhead instructions to be executed normally, whereby said processor is caused to execute all of said overhead and call processing instructions under conditions simulating said heavy load conditions.

9. An arrangement for artifically increasing the occupancy of a stored-program controlled central processor having an instruction execution controlling clock and a real-time measuring clock normally driven by said instruction execution controlling clock, said instruction execution clock normally being driven by a master clock, comprising means for counting the output pulses of said master clock, means operative to suppress output pulses from said instruction execution controlling clock, decoder means connected to said counting means for detecting the occurrences of predetermined counts of said master clock output pulses, second counter means controlled by said decoder means to commence counting a delay interval time, octal switch means settable to detect the occurrence of a predetermined count of said second counter means corresponding to a desired delay interval time, means controlled by said octal switch means detecting said predetermined count for disabling said instruction execution clock output pulse suppressing means, and means for coupling said master clock signals to drive said real-time measuring clock during the interval that said instruction execution clock output pulses are suppressed.

10. In a processor of a stored program controlled process control arrangement having first clock means for controlling the execution of instructions from a program stored in the memory unit of said processor, an arrangement for increasing the apparent load presented to said processor comprising means for storing an indicia individually associated to each of said instructions of said program characterizing the associated instructions as being "load related work" instructions or "overhead work" instructions; and control means responsive to first ones of said indicia in said indicia storing means characterizing an instruction as a "load related work" instruction for controlling said first clock means to extend the execution time of instructions so characterized.

11. In a processor of a stored program controlled process control arrangement in accordance with claim 10 wherein said first clock means generates clock signals defining execution frames and a plurality of times within said frames and wherein said control means in response to said first ones of said indicia means controls said first clock means to suspend the generation of output pulses for defined periods of time equal in duration to an integral number of said execution frames.

12. In a processor of a stored-program controlled process control arrangement in accordance with claim 11, the combination further comprising second clock means for defining the passage of absolute or "real time," and means operative during the interval when one of said first ones of said indicia means controls said first clock means to suspend the generation of output pulses for supplying pulses to permit said second clock means to run without interruption.

* * * * *